United States Patent [19]

Artz et al.

[11] Patent Number: 4,975,290

[45] Date of Patent: Dec. 4, 1990

[54] METHOD FOR INHIBITING LIPID OXIDATION IN FOODS AND COMPOUNDS USEFUL THEREFOR

[76] Inventors: William E. Artz, 111 Willard St., Urbana, Ill. 61801; Edward G. Schanus, 1208 SE. Lariat Dr., Bartlesville, Okla. 74006

[21] Appl. No.: 207,123

[22] Filed: Jun. 15, 1988

[51] Int. Cl.$^5$ .......................... A23B 4/02; A23L 1/304
[52] U.S. Cl. ...................................... 426/74; 426/322; 426/541
[58] Field of Search ................. 426/74, 542, 543, 520, 426/448, 449, 450, 133, 138, 140, 261, 264, 322, 332

[56] References Cited

U.S. PATENT DOCUMENTS

| | | | |
|---|---|---|---|
| 2,831,774 | 4/1958 | Furgal | 426/264 |
| 3,780,192 | 12/1973 | Danner | 426/332 |
| 3,992,556 | 11/1976 | Kovacs et al. | 426/620 |
| 4,058,621 | 11/1977 | Hill | 426/658 |
| 4,279,936 | 7/1981 | Jones et al. | 426/332 |
| 4,362,710 | 12/1982 | Watanabe | 426/74 |
| 4,670,288 | 6/1987 | Ikari et al. | 426/335 |
| 4,745,129 | 5/1988 | Ikari et al. | 426/335 |
| 4,764,388 | 8/1988 | Sullivan | 426/620 |
| 4,777,045 | 10/1988 | Vanderveer et al. | 426/74 |

OTHER PUBLICATIONS

N. W. Desrosier and J. N. Desrosier, *The Technology of Food Preservation*, 4th ed., 1977, pp. 358-359.
W. C. Frazier and D. C. Westhoff, *Food Microbiology*, 1988, pp. 225-227.
O. R. Fennema, Ed. *Food Chemistry*, 2nd ed., p. 776, H. O. Hultin, author.
S. B. Patel, A. J. King and Y. B. Lee, 1988, *J. Food Sci.* vol. 53, pp. 1610-1614.
A. J. King and L. A. Earl, 1988, *J. Food Sci.*, vol. 53, pp. 723-726.
L. F. Miller, H. B. Hedrick and M. E. Bailey, *J. Food Sci.*, 1985, vol. 50, pp. 478-481.
H. W.-S. Chan, *Autoxidation of Unsaturated Lipids*, 1987, pp. 1-2.
E. R. Sherwin in *Food Additives*, Ed. A. L. Branen, P. M. Davidson and S. Salminen, 1990, pp. 139-143, 160-162.
Tims, M. J. and Watts, B. M., Food Technology, vol. 12, p. 240, 1958, *Protection of Cooked Meats with Phosphates*.
Black, J. F., *Metal Catalyzed Autoxidation. The Unrecognized Consequences of Metal Hydroperoxide Complex Formation*, Nov. 1978, vol. 100, Journal of American Chemical Society, p. 527.
Pearson, A. M. and Gray, J. I., *Mechanism Responsible for Warmed-Over Flavor in Cooked Meat*, 1983 Symposium of Journal of American Chemical Society, Ch. 13, p. 287.
St. Angelo, Allen J. and Bailey, Milton E., editors, Warmed-Over Flavor of Meat, 1987, p. 19, Jane Love, *Mechanism of Iron Catalysis of Lipid Oxidation in Warmed-Over Flavor of Meat*.
Chemicals Used in Food Processing, 1965, NAS-NRC, p. 58.

*Primary Examiner*—Carolyn Paden
*Attorney, Agent, or Firm*—Kalish & Gilster

[57] ABSTRACT

A method for inhibiting lipid oxidation in food products such as uncured meat and extruded food products is disclosed. In this method, food products are treated with an aqueous solution of organic iron salt such as ferrous acetate, ferric acetate, ferrous gluconate, ferric gluconate, ferrous fumarate, ferric fumarate, ferrous lactate, ferric lactate, ferrous ascorbate, ferric ascorbate, ferric erythrobate, ferrous erthyrobate, ferrous glycerate, ferric glycerate, ferrous maleate, ferric maleate, ferrous pyruvate, ferric pyruvate, ferrous malate and ferric malate. The salts are water soluble as well as being readily dissociable. In uncured meats the concentration of the final iron concentration utilized is in the range of 20 to 50 parts per million while in extruded food products the final iron concentration utilized is in the range of 15 to 500 parts per million.

9 Claims, No Drawings

METHOD FOR INHIBITING LIPID OXIDATION IN FOODS AND COMPOUNDS USEFUL THEREFOR

FIELD OF THE INVENTION

This invention relates in general to food additives and, more particularly, to certain compounds adapted to promote the inhibition of lipid oxidation in foods and methods for utilizing same.

DESCRIPTION OF THE PRIOR ART it has been generally recognized that cooked food containing lipids are susceptible to oxidation of the lipids and thereupon can rapidly develop, upon subsequent storage or reheating, an objectionable flavor which is generally referred to in the art as "warmed-over" flavor—sometimes referred to as "WOF". This particular term was used initially in 1958 in an article in Food Technology, Vol. 12, Page 240 by M. J. Tims and B. M. Watts. This particular expression is utilized generally with meat, such as, beef, pork, lamb, poultry, fish and the like. In an ACS symposium series A. M. Pearson and J. I. Gray in 1983 discovered that the mechanism responsible for warmed-over flavor in cooked meat was caused by the heat induced transition metals catalysis or promotion of lipid oxidation; such transition metals as found in meat in low concentration include manganese, iron, cobalt and copper and salts thereof. J. F. Black in Volume 100 of the Journal of the American Chemical Society, page 527, in 1978 discussed from a theoretical standpoint the ability of transition metals, such as particularly, copper, cobalt and manganese to change extremely abruptly from catalysts to inhibitors as the concentrations thereof in solution were increased. Thus, such metals which would normally be catalysts for autoxidation can change to potent oxidation inhibitors. However, he states that the ability of transistion metals to inhibit oxidation is dependent upon the solvent polarity, and in solvents of high polarity inhibition would not occur. This indicates that this inhibition would not occur in food which contains water, a solvent of high polarity. Since substantially all foods contain water then this particular insight of Black would be without pertinency to the food field.

Thus, the investigative efforts made to the current time have been directed toward developing the chemical reactions, demonstrating in an entirely theoretical manner, without respect to any particular application, the capacity under specific conditions of certain transition metals to convert from a catalyst to inhibitor of oxidation, but only within systems within a solvent of low polarity. Thus, the prior art did not reveal such chemical activity within the particular field of inhibition of oxidation in food. In this connection it is of remarkable interest that in the 1987 publication "Warmed-Over Flavor of Meat" by St. Angelo and Bailey (Academic Press Inc.) one of the contributors persists in discussing iron, a transition metal, as being a catalyst of lipid oxidation in warmed-over flavor of meat (see page 19 et seq.).

The prior art, including particularly the article of Black, indicates inhibition of oxidation would not occur in any food containing water. Therefore, the inhibition of lipid oxidation, manifested as rancidity in processed cereal based food products, with the addition of any transition metals was never considered.

SUMMARY OF THE INVENTION

It is an object of the present invention to provide a method for preventing lipid oxidation in foods so as to prevent rancidity and/or "warmed-over" flavor.

It is another object of the present invention to provide a method of the character stated which comprehends the utilization of readily obtainable compounds.

It is another object of the present invention to provide a method of the character stated which may be easily performed with standard equipment and obviating the necessity of resorting to specialized devices and highly developed skills on the part of the practitioner.

It is another object of the present invention to provide a method of the character stated which by oxidation inhibition reduces warmed-over flavor in uncured meats of all types and materially improves the flavor of the meat upon subsequent preparation after storage.

It is a still further object of the present invention to provide a method of the character stated which is especially suitable with extruded food products, substantially reducing the rancidity thereof so that the store shelf life of the same is markedly increased without diminution in flavor and with such foods as has been atmospherically exposed the flavor is retained for periods substantially greater than would occur with methods presently available.

It is a still further object of the present invention to induce into food products the particular oxidation inhibitor in a simple, facile manner so that the requisite processing or manufacturing procedure is not prolonged or subjected to time consuming procedures.

It is another object of the present invention to provide a group of organic salts for treatment of foods, such as, uncured meats of all types and extruded cereal based food products for inducing inhibition of lipid oxidation for relative longevity of enhanced flavor.

It is a still further object of the present invention to provide a group of iron salts which upon integration with various food products reduce the rate of oxygen uptake by a most substantial percentage through utilization of a relatively low concentration of the compound.

DETAILED DESCRIPTION OF THE INVENTION

The present invention contemplates the application of certain organic iron compounds to food products, such as, uncured meats and extruded foods, for the purpose of enhancing the retention of the flavor thereof. The mechanism for bringing about such result appears to occur from the inhibition of lipid oxidation within the food product being treated. A theory of such mechanism would involve initiation through formation of a metal hydroperoxide complexed with solvents. A polar solvent will preferentially complex with the transition metal, as the organic iron salts in the present instance, while in solvents of low polarity i.e., fat, hydroperoxides will preferentially form a complex with the metal. The transition from catalyst to inhibitor may conceivably be due to the fact that with catalytic conditions the concentration of hydroperoxide exceeds the concentration of the transistion metal catalyst and the uncomplexed metal catalyst concentration remains low with respect to the hydroperoxide concentration. However, it would seem that when the metal concentration is increased to the point where it exceeds that of the hydroperoxide the concentration of uncomplexed catalyst or metal may, seemingly, increase substantially, such as possibly several thousand-fold with but a modest increase, as in the order of four-fold, in total metal concentration. Although, the complexed metal would appear to continue to cause chain propagation through continued homolytic scission of the hydroperoxides, free metal will apparently react with free radicals and thereby inactivate same and inhibit the oxidation.

Various transition metal salts were utilized in an effort to inhibit lipid oxidation in foods, as based upon the suggested theory set forth above. However, these efforts demonstrated most singularly that the sought for result namely, desirable flavor retention, could not in each instance be practically achieved. Thus, the salts of copper, manganese and chromium, although bringing about a suitable flavor, will cause a level of toxicity which would render the treated products inedible.

Efforts were then turned to evaluation of a group of both organic and inorganic iron salts which, from a theoretical standpoint, would have been expected to have been practically effective. However, practice demonstrated that such was not the case. For example, ferric and ferrous stearate, ferrous and ferric chloride and ferric citrate, among others, reacted in an exactly opposite fashion, causing an increase in oxidation, that is, serving as pro-oxidants as distinguished from oxidation inhibitors. These last-mentioned compounds are merely exemplary of compounds which one would have expected to have been operative as a result of prior theoretical investigations but were nonfunctional for the particular purpose for a variety of reasons, such as, inability for appropriate solubilization; inability of dissociation of the bond; the anion exhibiting a pro-oxidant effect, etc. An example of the latter would be the ferric and ferrous chlorides Consequently, the development of a very limited number of transition salts capable of providing the requisite flavor could only have been brought about through extreme scrutiny and development of conditions which rendered the same capable for the intended purpose.

Accordingly it has been found that those iron salts that will effect the requisite inhibition of lipid oxidation, resulting in the desired flavor attributes, must necessarily possess certain critical common properties namely, at least moderate solubility in water; be nontoxic in the concentrations utilized; must not exhibit pro-oxidant behavior; and must be effectively dissociable. The solubility must be within the range of approximately 100 parts per million to 1000 parts per million or in excess thereof in order to achieve a final iron concentration within the food product in question, which for uncured meat is approximately 20 to approximately 50 parts per million, and for extruded products is approximately 15 to 500 parts per million. Compounds which possess the foregoing properties include the following: ferrous acetate, ferric acetate, ferrous gluconate, ferrous fumarate, ferric gluconate, ferric fumarate, ferrous lactate, ferric lactate, ferrous ascorbate, ferric ascorbate, ferrous erythrobate, ferric erythrobate, ferrous glycerate, ferric glycerate, ferrous pyruvate, ferric pyruvate, ferrous malate and ferric malate, ferrous maleate and ferric maleate. These particular organic iron salts provide the appropriate concentration of free metal to effect the intended result namely, the reduction of lipid oxidation in food products and warmed over flavor in cooked meat.

Thus, adding an excess of the specific iron salt, which is normally a very potent oxidative catalytic agent, to inhibit lipid oxidation in food products has to the inventors' knowledge never been suggested heretofore. Accordingly, application of these particular iron salts to reduce lipid oxidation in food and eliminate or reduce warmed-over flavor in meat is a completely novel and totally unexpected utilization of these particular iron salts.

EXAMPLE I

The longissimus dorsi muscle, or so-called loin, from a beef steer (grade - good) was within 6 days of slaughter injected, as by a syringe, stitch pumping, or otherwise, with a solution of ferrous acetate. The muscle samples had been previously cut into 0.6 to 0.8 kg sections and each injected with 5% of its weight of an aqueous solution containing 700 parts per million of ferrous acetate to obtain a concentration of 35 ppm of added iron in each loin. Each of said injected meat samples were then hand massaged, tumbled, or otherwise agitated for a period of approximately 3 minutes to insure uniform distribution of the ferrous acetate aqueous solution. Then the injected sample was stored at a temperature of 3° C. for 24 hours to insure equilibration, that is, uniform distribution of the ferrous acetate. The samples are then ready to cook in a conventional oven at 163° C. to an internal temperature of 72° C. and would then be ready for serving. The prepared meat can be cut into individual serving sizes and packaged appropriately in the conventional manner for frozen storage. The individual packages could then be distributed for retail sale and the consumer could now reheat same in a conventional or microwave oven. The flavor of the retail product proved superior to that of a product treated similarly, but without added iron. The meat thus prepared was submitted to an expert test panel at the University of Illinois in whose judgment the iron containing product had superior flavor over the product devoid of the added iron. Similar uncured beef prepared in accordance with the foregoing, but without being treated by ferrous acetate, would, upon reheating, have a flavor readily detectable of marked inferiority with respect to the sample containing the added ferrous acetate. Such is a result of the novel inhibition of lipid oxidation brought about by the injection of the ferrous acetate.

EXAMPLE II

The procedure set forth in Example I wherein ferrous gluconate is utilized in the same quantity and in the same manner as ferrous acetate brought about substantially identical results.

EXAMPLE III

The procedure set forth in Example I is followed but in this case the iron salt, ferrous gluconate, is injected in an aqueous solution to 10% of the weight of the muscle at a concentration of 350 parts per million ferrous gluconate to attain concentration in the meat of 35 ppm bringing about the same effect upon the final product flavor.

The foregoing examples are not intended to be exhaustive but do demonstrate the utilization of the particular group of organic iron salts for inhibiting lipid oxidation in uncured meats; which manifestly are water containing; the water being a solvent of high polarity. It is apparent that the solution of the iron salt would be effective in excess of 10% by weight of the meat being treated, but the examples are designed to demonstrate the applicability of the present invention within the presently accepted limits in the meat industry relating to the addition of water generally. As indicated above, none of the specifically named organic iron salts bring about an undesired toxicity to the treated meat and all serve equally to retain the desired flavor.

The examples hereinabove discussed disclose the utilization of aqueous solutions which bear a ratio by weight of 5 to 10% to that of the meat being treated. However, it is to be understood that these percentages are not critical; being utilized merely to conform with the expected ratio current in industry. Greater amounts, such as in excess of 10% of the weight of the meat being treated could be effectively and practically utilized. The criterion is determined by the desired final concentration of the iron within the meat which, as pointed out above, must be within the range of approximately 20 to 50 parts per million. It is to be further understood that the solution may be less than 5% by weight of the meat being treated since, as already expressed, the resultant iron concentration is paramount and, therefore, it would simply be a matter of the strength of the added solution which has been appropriately adjusted.

Furthermore, the examples set forth above have indicated that the meat subsequent to injection by the solution of the iron compound is massaged, tumbled, or otherwise agitated. Such expedients are utilized merely for the purpose of expediting or accelerating the attainment of a state of equilibrium wherein the iron is appropriately distributed within the sample treated. However, it should be understood that, if desired, such agitation may be eliminated and the treated meat permitted to remain in a static or quiescent state for that period of time requisite to permit the injected solution to permeate the matter so as to bring about the desired distribution therein of the iron.

Precooked convenience meat entrees provide substantial nutritional benefits to the consumer as an excellent source of both protein and water soluble vitamins. Yet, the continued presence of the objectional odor and flavor of warmed-over foods will cloud the economic picture for these products. A solution to the problem of warmed over foods would provide an enormous potential increase in sales of uncured meat products. Convenience products have enjoyed continued growth in sales during recent years. With the increase in disposable income and the decrease in available food preparation time, demand for a high quality, precooked meat products, like prebrowned beef steaks, is substantial. Therefore, elimination of the warmedover problem in precooked meat products would allow the use of precooked meat products in one of the fastest growing food product areas, gourmet frozen food dinners.

EXAMPLE IV

A cereal based snack food product was utilized which was comprised of corn starch, 5% soybean oil by weight, and 29% moisture by weight was extruded in a Werner Pfleiderer (Model ZSK 30) twin screw extruder with a high shear screw configuration. The temperature profile of the extruder was 35-50-150-150-150° C. in the five sections of the barrel. The starch feed rate was 200 g/min. and the screw speed was 200 rpm. The die contained twin holes with a 9 mm internal diameter with the moisture being added in the first zone and the oil being added in the second zone. The ferrous acetate was added in the feed water which was pumped in during the extrusion process to attain a final concentration in the product of 50 parts per million of iron based on the total weight of starch and soybean oil. In view of the foregoing extruder specifications it is quite evident that one having ordinary skill in the food product extruding art could readily extrapolate therefrom so as to render economically commercial the use of ferrous acetate as well as the other stated organic iron salts for enhancing the flavor qualities of the particular food product in question. The extrudate that was produced has a much greater length of storage time during which the desirable flavor can be maintained.

EXAMPLE V

The cereal based snack food preparation in Example IV was followed but with the exception that the ferrous gluconate was used in lieu of ferrous acetate and whereby the concentration of iron in the feed water was increased four-fold to attain in the final product a concentration of 200 parts per million rather than 50 parts per million, with such achieving the same desired flavor result.

Although the foregoing Examples have related to the utilization of ferrous acetate and ferrous gluconate it is to be understood that the other named organic iron salts hereinabove set forth are equally effective but examples embodying the same have not been set forth merely to avoid obvious repetition. The term "cereal based" as used includes corn, rice, millet, barley, oats and wheat; as products of the same are amenable to like rancid reduction by the present invention.

It is, of course, understood that such cereal based products inherently contain a predetermined quantity of oil which would bring about relatively rapid undesired rancidity if not treated in accordance with the present invention. Understandably, numerous food products, particularly in the snack food field, are treated with oils, such as particularly the vegetable oils, including, by way of example only, soybean, corn, coconut, palm and the like for modifying and improving the flavor of the product. Consequently, the inclusion of such added oils will tend to promote rancidity and, thus, cause the utilization of the present invention to be all the more critical. The comments made hereinabove with respect to meats treated by the present invention are, of course, equally applicable with respect to cereal based extruded food products which enjoy a seemingly ever increasing popularity so that reduction in rancidity is a factor of considerable importance to the consumer and which property is easily and economically obtained by practice of the present invention.

I claim:

1. A method for treating food products; said method consisting essentially of providing a food product from the group consisting of uncured meat and extruded cereal based products and treating such food product with a solution containing approximately 100 parts per million to 1000 parts per million so as to permit substantially uniform distribution within such food product of up to 500 parts per million iron in a solution of an iron compound from the group consisting of ferrous acetate, ferric acetate, ferrous gluconate, ferric gluconate, ferrous fumarate, ferric fumarate, ferrous lactate, ferric lactate, ferrous ascorbate, ferric ascorbate, ferrous erythrobate, ferric erythrobate, ferrous glycerate, ferric glycerate, ferrous maleate, ferric maleate, ferrous pyruvate, ferric pyruvate, ferrous malate, and ferric malate, thereby to inhibit lipid oxidation within the food product so treated for chemically preventing warmed over flavor in uncured meat or rancid flavor in extruded cereal based products after subsequently cooking or thermally processing such food product.

2. A method of treating uncured meat and fish for inhibition of lipid oxidation for chemically preventing warmed over flavor therein after cooking or thermally processing such meat and fish; said method consisting essentially of injecting approximately 100 parts per million to 1000 parts per million iron in an aqueous solution of iron salt from the group consisting of ferrous acetate, ferric acetate, ferrous gluconate, ferric gluconate, ferrous fumarate, ferric fumarate, ferrous lactate, ferric lactate, ferrous ascorbate, ferric ascorbate, ferric erythrobate, ferrous erythrobate, ferrous glycerate, ferric glycerate, ferrous maleate, ferric maleate, ferrous pyruvate, ferric pyruvate, ferrous malate, and ferric malate into the meat, allowing the injected solution to attain substantially uniform distribution within the treated, uncured meat and fish, so as to obtain a final concentration of approximately 20 parts per million to 50 parts per million iron within the treated, uncured meat and fish, then subjecting the treated, uncured meat and fish to cooking.

3. A method as defined in claim 2 wherein the injected meat is permitted to remain static for a predetermined period of time to attain such uniform distribution.

4. A method as defined in claim 2 wherein the injected meat is subjected to agitation for expediting the attainment of such uniform distribution.

5. A method of treating extruded cereal based products for inhibiting lipid oxidation for chemically preventing rancid flavor therein after cooking or thermally processing such cereal based products; said method comprising substantially uniformly distributing within such cereal based products a final concentration of approximately 15 to 500 parts per million iron by adding thereto a solution of an iron salt from the group consisting of ferrous acetate, ferric acetate, ferrous gluconate, ferric gluconate, ferrous fumarate, ferric fumarate, ferrous lactate, ferric lactate, ferrous ascorbate, ferric ascorbate, ferric erythrobate, ferrous erythrobate, ferrous glycerate, ferric glycerate, ferrous maleate, ferric maleate, ferrous pyruvate, ferric pyruvate, ferrous malate and ferric malate having a soluble iron concentration of approximately 100 to 1000 parts per million.

6. The method as defined in claim 5 wherein the iron compound solution is added to feed water pumped in during the extrusion process.

7. A food flavor preservative for treating uncured meats and fish, prior to cooking, and extruded cereal-based products and grains, said preservative consisting essentially of a lipid oxidation inhibitor in aqueous solution and selected from the group consisting of ferrous acetate, ferric acetate, ferrous gluconate, ferric gluconate, ferrous fumarate, ferric fumarate, ferrous lactate, ferric lactate, ferrous ascorbate, ferric ascorbate, ferric erythrobate, ferrous erythrobate, ferrous glycerate, ferric glycerate, ferrous maleate, ferric maleate, ferrous pyruvate, ferric pyruvate, ferrous malate, and ferric malate; said preservative having moderate water solubility, being devoid of exhibiting pro-oxidant behavior, being effectively dissociable, and having a soluble iron concentration of at least approximately 100 parts per million to 1000 parts per million.

8. A food flavor preservative for treating uncured meats and fish, prior to cooking, said preservative consisting essentially of a lipid oxidation inhibitor in aqueous solution and selected from the group consisting of ferrous acetate, ferric acetate, ferrous gluconate, ferric gluconate, ferrous fumarate, ferric fumarate, ferrous lactate, ferric lactate, ferrous ascorbate, ferric ascorbate, ferric erythrobate, ferrous erythrobate, ferrous glycerate, ferric glycerate, ferrous maleate, ferric maleate, ferrous pyruvate, ferric pyruvate, ferrous malate, and ferric malate; said preservative having moderate water solubility, being devoid of exhibiting pro-oxidant behavior, being effectively dissociable, and having a soluble iron concentration of at least approximately 100 parts per million to 1000 parts per million; wherein said preservative is provided with soluble iron of such predetermined concentration that when used for treating a food product, such food product being uncured meat from the class consisting of beef, pork, lamb, poultry and fish, that the food product will have an iron concentration of approximately 20 to 50 parts per million after treating with said preservative.

9. A food flavor preservative for treating extruded cereal-based products and grains, said preservative consisting essentially of a lipid oxidation inhibitor in aqueous solution and selected from the group consisting of ferrous acetate, ferric acetate, ferrous gluconate, ferric gluconate, ferrous fumarate, ferric fumarate, ferrous lactate, ferric lactate, ferrous ascorbate, ferric ascorbate, ferric erythrobate, ferrous erythrobate, ferrous glycerate, ferric glycerate, ferrous maleate, ferric maleate, ferrous pyruvate, ferric pyruvate, ferrous malate, and ferric malate; said preservative having moderate water solubility, being devoid of exhibiting pro-oxidant behavior, being effectively dissociable, and having a soluble iron concentration of at least approximately 100 parts per million to 1000 parts per million; wherein said preservative is provided with soluble iron of such predetermined concentration that when used for treating a food product, such food product being an extruded cereal based product from the class consisting of extruded wheat, barley, oats, millet, rice and corn, that the food product will have an iron concentration of approximately 15 parts per million to 500 parts per million after treating with said preservative.

* * * * *